(12) United States Patent (10) Patent No.: US 8,117,195 B1
Dave et al. (45) Date of Patent: Feb. 14, 2012

(54) PROVIDING BLOG POSTS RELEVANT TO SEARCH RESULTS

(75) Inventors: Kushal Dave, New York, NY (US);
Joshua D. Mittleman, Croton-on-Hudson, NY (US); Kevin Scott, New York, NY (US); Vladislav Shchogolev, New York, NY (US); David Alpert, New York, NY (US)

(73) Assignee: Google Inc., Mountain View, CA (US)

( * ) Notice: Subject to any disclaimer, the term of this patent is extended or adjusted under 35 U.S.C. 154(b) by 88 days.

(21) Appl. No.: 11/386,083

(22) Filed: Mar. 22, 2006

(51) Int. Cl.
*G06F 7/00* (2006.01)
*G06F 17/30* (2006.01)

(52) U.S. Cl. .................... 707/730; 707/706; 707/726

(58) Field of Classification Search ............. 707/5, 100, 707/3, 726, 999.1, 999.003, 730, 706
See application file for complete search history.

(56) References Cited

U.S. PATENT DOCUMENTS

| | | | |
|---|---|---|---|
| 6,421,675 B1 * | 7/2002 | Ryan et al. .............. | 707/100 |
| 6,510,406 B1 * | 1/2003 | Marchisio ............... | 704/9 |
| 7,734,610 B2 | 6/2010 | Rakowski et al. | |
| 7,765,209 B1 | 7/2010 | Khesin et al. | |
| 2005/0060297 A1 | 3/2005 | Najork | |
| 2006/0069663 A1 | 3/2006 | Adar et al. | |
| 2006/0284744 A1 | 12/2006 | Shotland | |
| 2006/0287989 A1 | 12/2006 | Glance | |
| 2007/0038646 A1 | 2/2007 | Thota | |
| 2007/0050389 A1 | 3/2007 | Kim et al. | |
| 2007/0061297 A1 | 3/2007 | Bihun et al. | |
| 2009/0313116 A1 | 12/2009 | Ashbaugh | |
| 2010/0070448 A1 | 3/2010 | Omoigui | |
| 2010/0131505 A1 | 5/2010 | Erickson | |
| 2010/0161605 A1 | 6/2010 | Gabrilovich et al. | |
| 2010/0191722 A1 | 7/2010 | Boiman et al. | |
| 2010/0223261 A1 | 9/2010 | Sarkar | |

FOREIGN PATENT DOCUMENTS

| | | |
|---|---|---|
| KR | 10-2005-0077 | 8/2005 |
| WO | WO 2005/033978 | 4/2005 |
| WO | WO 2007/033202 | 3/2007 |

OTHER PUBLICATIONS

BlogPulse.com screenshots (http://web.archive.org/web/20050105041813/http://blogpulse.com), Jan. 5, 2005.*
BlogPulse: Automated Trend Discovery for Weblogs, Natalie S. Glance et al., (http://web.archive.org/web/20041204045153/http://www.blogpulse.com/papers/www2004glance.pdf), Dec. 4, 2004.*

(Continued)

*Primary Examiner* — Mohammad Ali
*Assistant Examiner* — Alexey Shmatov
(74) *Attorney, Agent, or Firm* — Harrity & Harrity, LLP

(57) ABSTRACT

A device identifies a search result document based on a search query, and searches a blog post repository to identify a blog post relevant to the search result document. The device also rejects the blog post if the blog post has insufficient length, contains outgoing links located a predetermined distance from the beginning of the blog post, has a large out-degree, was created before or after a predetermined time, or has incoming links with a low link-based score. The device further provides the blog post in connection with the search result document if the blog post was not rejected.

28 Claims, 15 Drawing Sheets

OTHER PUBLICATIONS

Sergey Brin et al., The PageRank Citation Ranking: Bringing Order to the Web, Jan. 29, 1998 (http://citeseer.ist.psu.edu/page98pagerank.html).*

Naoto Tanimoto, et al., "The EnginRumor Algorithm for Calculating Reputation of Information Resources in Electronic Communities". IPSJ SIG Technical Report, vol. 2005, No. 2005-DPS-121 Multi-Media Communications and Decentralized Processing 2005-GN-54 Groupware and Net Work Service, IPSJ SIG, Jan. 20, 2005, pp. 37-42.

Shinsuke Nakajima, et al., "Web Information Filtering based on Blog Trust", IPSJ vol. 2004, No. 72, 2004-DBS-134(II), IPSJ, Jul. 15, 2004, pp. 699-705.

Belle L. Tseng et al., "Tomographic Clustering to Visualize Blog Communities as Mountain Views". WWW 2005 2nd Annual Workshop on the Weblogging Ecosystem, May 10-14, 2005, 6 pages.

Wikipedia, "A9.com", http://en.wikipedia.org/wiki/A9.com, Feb. 24, 2011, 3 pages.

Bloglines, www.bloglines.com, print date—Sep. 12, 2005.

Blogpulse, www.blogpulse.com, print date—Sep. 12, 2005.

Technorati, www.technorati.com, print date—Sep. 12, 2005.

Feedster, www.feedster.com, print date—Sep. 12, 2005.

Icerocket, www.icerocket.com, print date—Sep. 12, 2005.

MarketingVox, www.marketingvox.com, print date—Sep. 12, 2005.

K. Fujimura et al., "The EigenRumor Algorithm for Ranking Blogs", WWW 2005, May 10, 2005, XP-002409677, http://www.blogpulse.com/papers/2005/fujImura.pdf, pp. 1-6.

K. Fujimura et al., "The EigenRumor Algorithm for Calculating Contributions in Cyberspace Communities", LNAI 3577, XP019013593, Aug. 2005, pp. 59-74.

Y. Medynskiy, "Implicit Links in Asynchronous Communication Spaces", CHI 2005, XP-002409678, Apr. 2, 2005, Cornell University, http://www.socialcomputingresearch.net/chi_papers/Medynskiy.pdf, pp. 1-3.

N. Glance et al., "BlogPulse: Automated Trend Discovery for Weblogs", WWW 2004, XP-002409679, May 17, 2004, New York, USA, http://www.blogpulse/com/papers/www2004glance.pdf, pp. 1-8.

D. Gruhl et al., "Information Diffusion Through Bolgspace", WWW 2004, XP-002409680, May 17, 2004, http://www2004.org/proceedings/docs/1p491.pdf, pp. 491-501.

International Search Report and Written Opinion dated Dec. 13, 2006.

Washington Post, "Police Charge Md. Student in Murder", Feb. 9, 2006, 3 pages.

Agylen, "Google Web Comments Firefox Extension", http://agylen.com/2005/12/27/google-web-comments-firefox-extension, Dec. 27, 2005, pp. 1-4.

Robert Charlton et al., "Google SEO News and Discussion Forum", http://www.webmasterworld.com/google/3110041.htm, Oct. 5, 2006, pp. 1-4.

Phillipp Lenssen, "Google Search Tips 2005", http://blogoscoped.com/archive/2005-09-29-n85.html, Sep. 29, 2005, pp. 1-5.

* cited by examiner

PROVIDING BLOG POSTS RELEVANT TO SEARCH RESULTS

BACKGROUND

1. Field of the Invention

Implementations described herein relate generally to information retrieval and, more particularly, to providing blog posts that may be relevant to a search result.

2. Description of Related Art

Modern computer networks, and in particular, the Internet, have made large bodies of information widely and easily available. Internet search engines, for instance, index many millions of web documents that are linked to the Internet. A user connected to the Internet can enter a simple search query to quickly locate web documents relevant to the search query.

A blog (or "web log") may be a web site in which items (e.g., an online journal or diary) may be posted on a regular basis and may be displayed in reverse chronological order. Individual articles on a blog may be referred to as "blog posts," "posts" and/or "entries." Blogs may often provide useful information about a search result, such as honest reviews, contrasting opinions, links to related material, etc. Unfortunately, search engines do not display blog posts that are relevant to a specific search result, making it difficult to find blog posts containing information useful to a search query.

SUMMARY

According to one aspect, a method may include presenting a search result, and presenting information associated with a blog post relevant to the search result.

According to another aspect, a method may include identifying a search result document based on a search query, searching a blog post repository to identify a blog post relevant to the search result document, and providing the blog post relevant to the search result document.

According to a further aspect, a system may include means for identifying a search result document based on a search query, and means for searching a blog post repository to identify a blog post relevant to the search result document. The system may also include means for rejecting the blog post if the blog post has insufficient length, contains outgoing links located a predetermined distance from the beginning of the blog post, has a large out-degree, was created before or after a predetermined time, or has incoming links with a low link-based score. The system may further include means for providing the blog post in connection with the search result document if the blog post was not rejected.

According to yet another aspect, a system may include means for presenting a search result, means for identifying a blog post that includes information relevant to the search result, and means for presenting information associated with the blog post in connection with the search result.

According to still another aspect, a device may include a memory to store instructions for presenting a search result, and instructions for presenting information associated with a blog relevant to the search result. The device may also include a processor to execute the instructions in the memory.

According to still yet another aspect, a method may include presenting a search result, presenting a selectable item with the search result, identifying a blog post that includes information relevant to the search result, and presenting information associated with the blog post in connection with the search result when the selectable item is selected.

According to another aspect, a method may include filtering a set of blog posts to identify a subset of blog posts by at least one of rejecting a blog post if the blog post has insufficient length, rejecting the blog post if the blog post contains outgoing links located a predetermined distance from the beginning of the blog post, rejecting the blog posts if the blog post has a large out-degree, rejecting the blog post if the blog post has existed for a predetermined amount of time, or rejecting the blog post if the blog post has incoming links with a low link-based score. The method also includes storing the subset of blog posts in a memory.

According to a further aspect, a method may include accessing blog posts in a blog post repository, and for a set of the blog posts: rejecting a blog post if the blog post in the set of blog posts contains more than a predetermined number of outgoing links, rejecting the blog post if the blog post contains less than a predetermined number of incoming links, rejecting the blog post if the blog post contains incoming links having link-based scores below a threshold, and rejecting the blog post if the blog post contains an outgoing link to electronic media. The method may also include removing the rejected blog posts from the repository.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Figure 1:
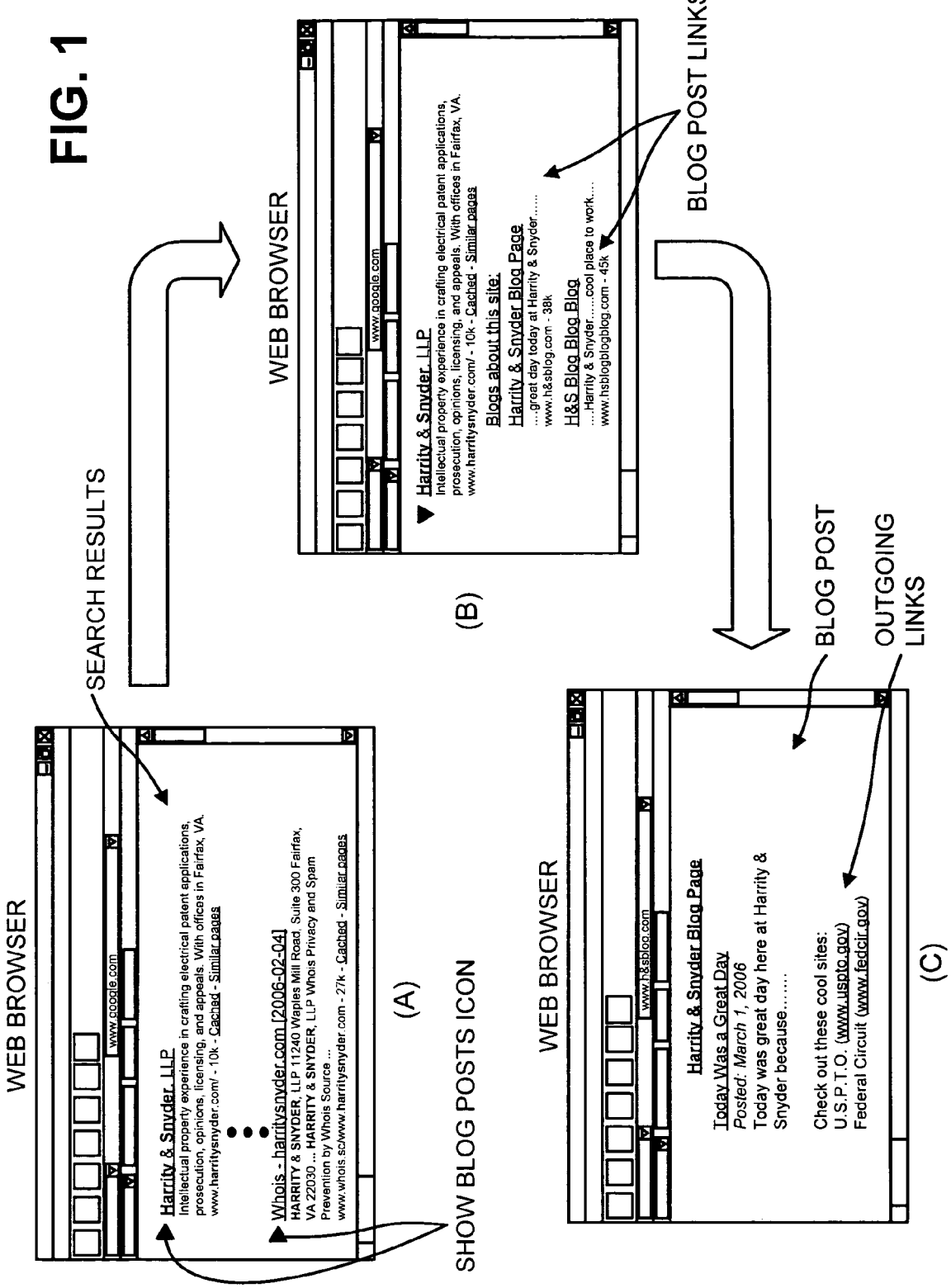
FIG. 1 is an exemplary diagram illustrating a concept consistent with the principles of the invention.

Systems and methods consistent with the principles of the invention may provide information associated with blog posts that may be relevant to a search result. FIG. 1 is an exemplary diagram illustrating a concept consistent with the principles of the invention. As shown at (A), a user may access search results with a search engine, such as the Google search engine, using a web browser. Each search result may include, among other things, a hyperlink or link (where underlining may denote a link) to a document associated with the search result, a snippet associated with the search result, and/or a document address (e.g., www.harritysnyder.com) associated with the search result. Each search result may include an icon or graphic, which, when selected by a pointing device (e.g., a mouse), may display information associated with blog posts that may be relevant to the search result.

As shown at (B) in FIG. 1, if the "show blog posts" icon is selected, information associated with blog posts that may be relevant to a search result may be displayed. For example, if a user selects the "show blog posts" icon next to the "Harrity & Snyder, LLP" search result, information associated with blog posts that may be relevant to this search result may be displayed with the search result. Information associated with each blog post may include a link to the blog post, a snippet associated with the blog post, an address associated with the blog post, a title of the blog post (e.g., which may take the form of a link to the blog post), a name of the blog containing the blog post, and/or a date when the blog and/or blog post was created. For example, although information associated with any number of blog posts may be displayed, FIG. 1 shows two blog posts, "Harrity & Snyder Blog Page" and "H&S Blog Blog Blog," and their associated information with the "Harrity & Snyder, LLP" search result.

As shown at (C) in FIG. 1, selection of a blog post link may cause the blog post to be presented to the user, where the blog post may include useful information associated with the search result. For example, if a user selects the blog post link for the "Harrity & Snyder Blog Page," then the document (e.g., blog post) for the Harrity & Snyder Blog Page may be displayed. The document may include any type of information, such as outgoing links (e.g., www.uspto.gov and www.fedcir.gov). An outgoing link may include any document to which the blog post links.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a blog post, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
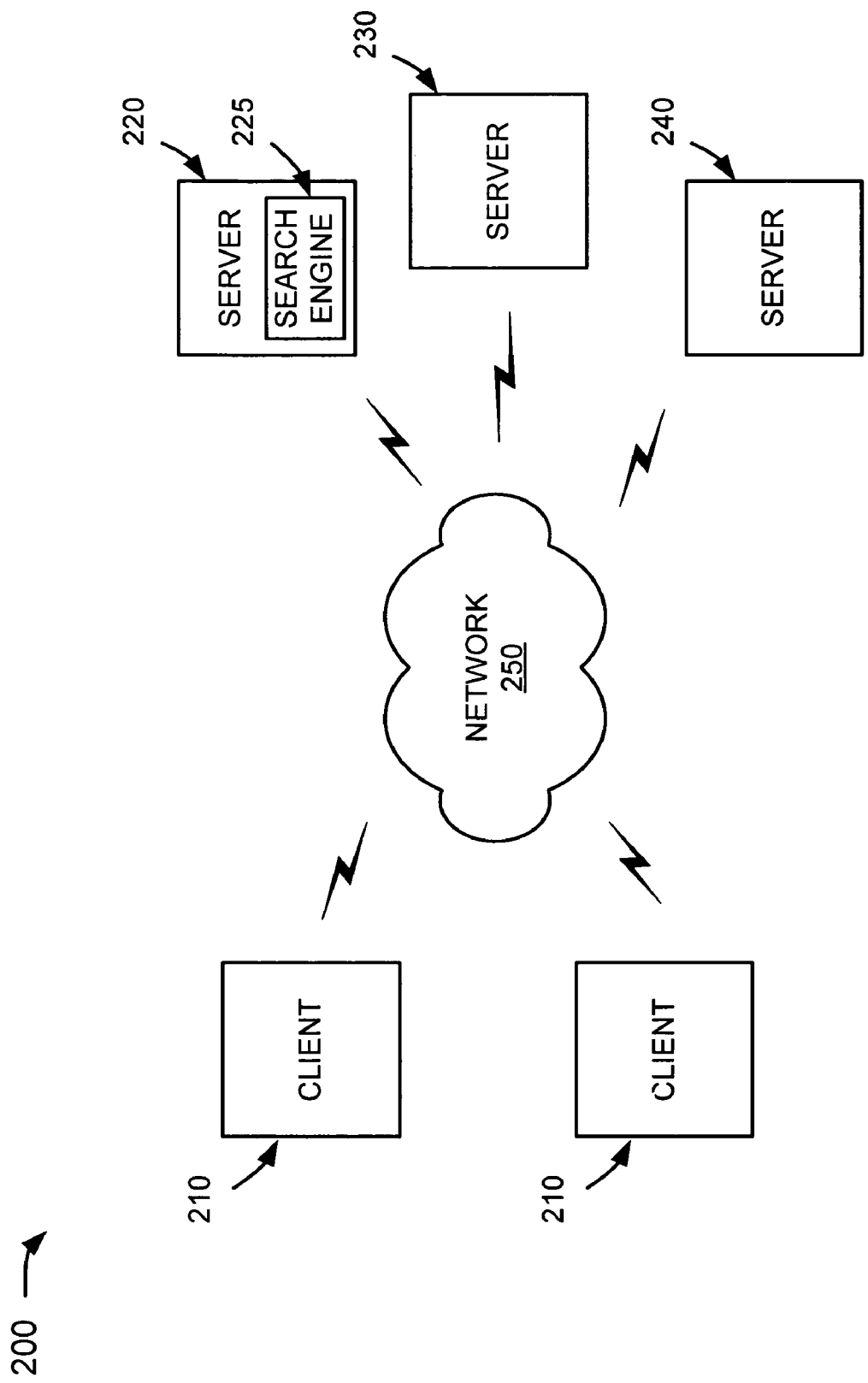
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. Server 220 may crawl a corpus of documents (e.g., web documents), index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
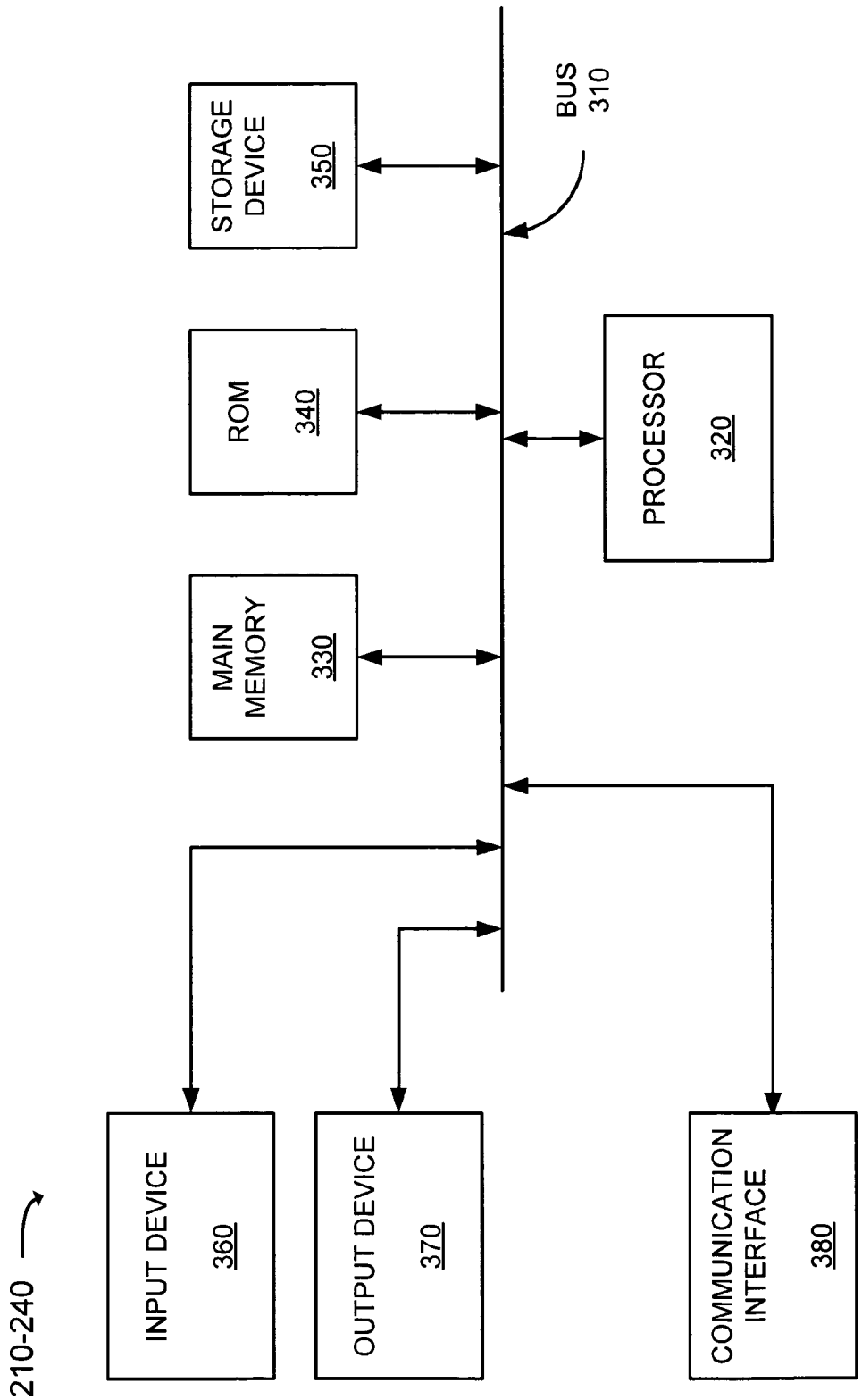
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 4-9 are flowcharts of exemplary processing for providing information associated with blog posts that may be relevant to a search result according to an implementation consistent with the principles of the invention. The processing of FIGS. 4-9 may generally be described as determining a repository of acceptable blog posts and identifying and presenting information associated with blog posts relevant to a list of search results. The processing of FIGS. 4-7 may correspond to determining the repository of acceptable blog posts. The processing of FIGS. 8 and 9 may correspond to identifying and presenting information associated with blog posts relevant to the list of search results.

The processing of FIGS. 4-9 may be performed by one or more software and/or hardware components within a client/server entity, such as one or more of clients 210 and/or servers 220-240. In another implementation, the processing may be performed by one or more software and/or hardware components within another device or a group of devices separate from or including clients 210 and/or servers 220-240.

Figure 4:
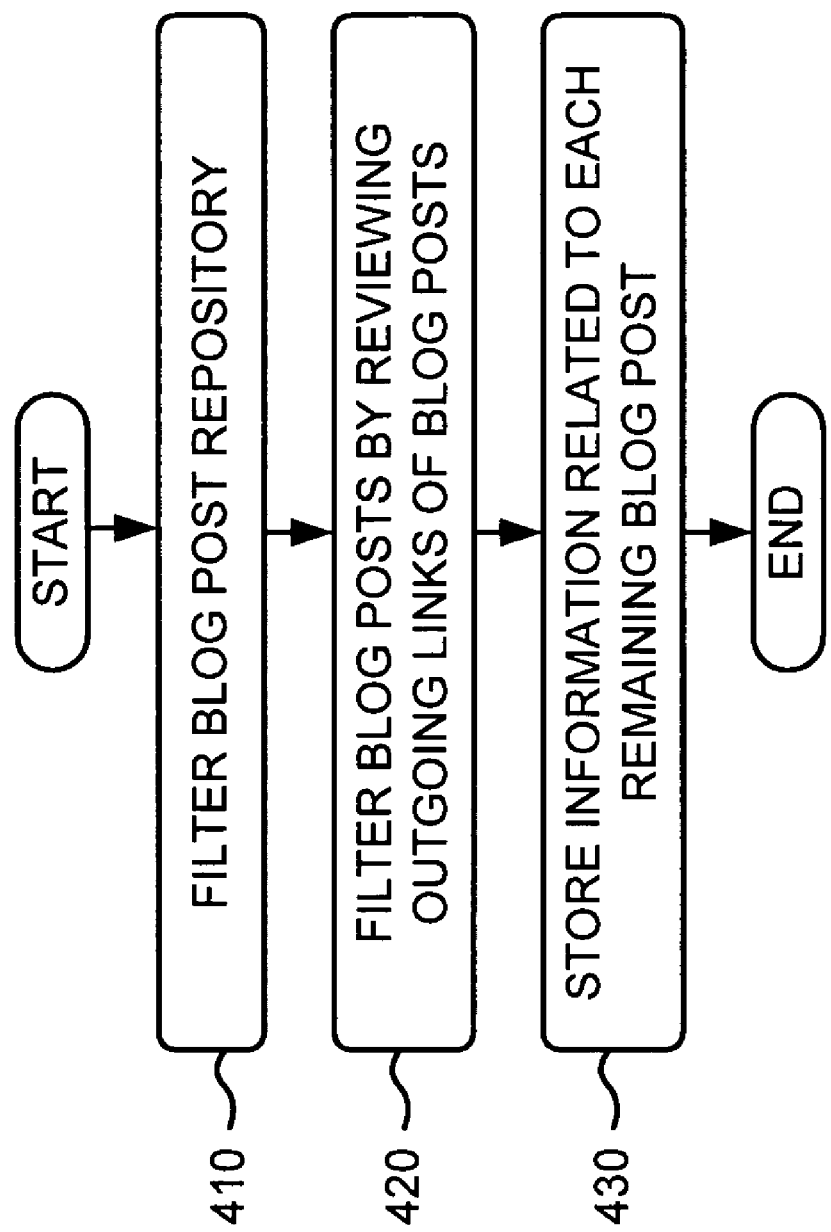
FIGS. 4-9 are flowcharts of exemplary processing for providing information associated with blog posts that may be relevant to a search result according to an implementation consistent with the principles of the invention.

The processing of FIG. 4 may begin with a crawling of a network (e.g., the Internet) to identify and store blog posts in a repository. The repository of blog posts may be accessed and filtered based on a set of rules (block 410). In one implementation, a server or servers (e.g., servers 220-240) may, for example, use a search engine to index many millions of blog posts that are linked to the Internet and may store the blog posts in a repository. The server(s) may filter out any undesirable blog posts (e.g., blog posts containing profanity, pornography, racism, spam, stolen content, chain letters, viruses, spyware, fraudulent solicitations, unwanted pop-up advertisements, etc.) from the repository. As used herein, the terms "removed" and "rejected" may mean that a blog post is removed completely from the blog post repository and deleted, marked in some manner, or moved to another database or repository.

One example of an undesirable blog is a spam blog, sometimes referred to by the neologism "splog." Splogs may include blogs which the author uses only for promoting affiliated documents (e.g., documents linked to by the splog). The purpose of a splog may be to increase the link-based score of affiliated documents, get advertising impressions from visitors, and/or use the blog as a link outlet to get new documents indexed. The content on a splog may often be nonsense or text stolen from other documents with an unusually high number of links to documents associated with the splog creator which are often disreputable or otherwise useless documents.

Any remaining blog posts may be filtered by reviewing the outgoing links of the remaining blog posts (block 420). For example, an outgoing link of a blog post may be reviewed to see if the outgoing link may include undesirable content (e.g., profanity, pornography).

Several pieces of information related to the remaining blog posts may be stored (block 430). For example, information relating to a specific outgoing link of a blog post (e.g., link anchor text), and information relating to the blog post (e.g., title of the blog post, length of the blog post, etc.) may be stored in a client/server entity, such as one or more of clients 210 and/or servers 220-240.

The processing of FIG. 4 may reduce the number of blog posts to a smaller set of candidates that may be displayed with search results. The processing of FIG. 4 will be described in greater detail below with reference to FIGS. 5-7.

Figure 5:
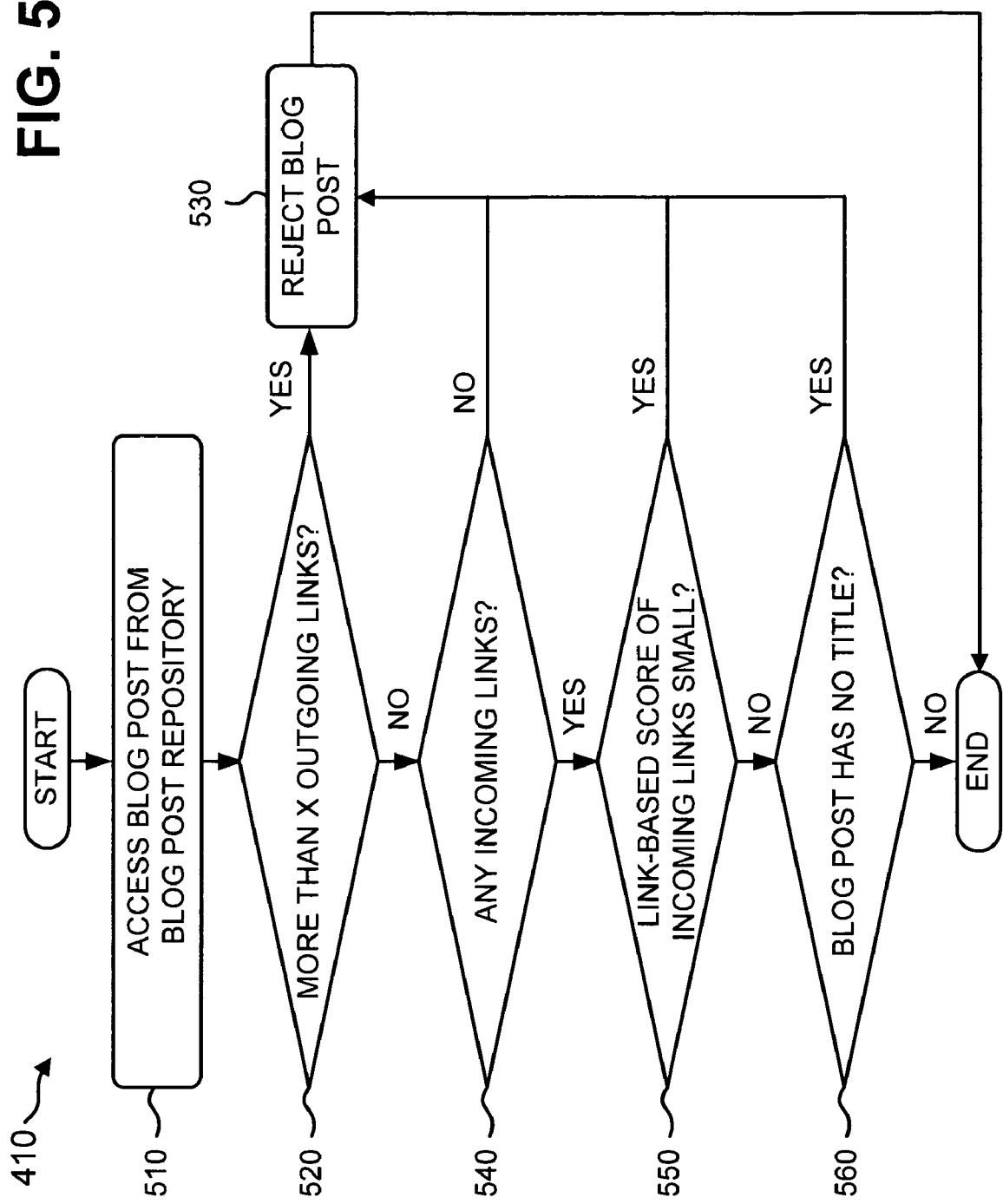

Block 410 of FIG. 4 may include the processing shown in FIG. 5. Processing may begin by accessing a blog post from the blog post repository (block 510). The processing of FIG. 5 may be performed on each blog post contained in the blog post repository. For example, a server or servers (e.g., servers 220-240) may be used to retrieve a blog post from the repository. If the blog post has more than "x" outgoing links (where "x" may be a predetermined number, such as fifty (50)) (block 520—YES), then the blog post may be rejected (i.e., removed from the repository) (block 530). For example, in one implementation, a blog post having only unwanted advertisements or a blog post that is a splog may include greater than "x" outgoing links, and may be removed from the repository (i.e., rejected) because it may be undesirable. If the blog post has less than "x" outgoing links (block 520—NO), then it may be determined whether the blog post has any incoming links (block 540).

In another implementation, "x" may be learned by statistical analysis. For example, the blog post repository may be used to train a statistical model (e.g., a Bayesian model or some other machine learning technique) to find a value for "x" that may provide a good tradeoff between false positives (e.g., accepted blog posts) and false negatives (e.g., rejected blog posts).

If the blog post has no incoming links (block 540—NO), then the blog post may be rejected (block 530). For example, a blog post may have zero incoming links because the blog post does not contain any useful information and nobody is interested in it. Such a useless blog post may be removed from the repository. If the blog post has at least one incoming link (or, e.g., a predetermined minimum number of incoming links) (block 540—YES), then it may be determined if the link-based score(s) of incoming link(s) to the blog post is/are small (block 550). A link-based scoring technique may assign numerical weighting to each element of a hyperlinked set of documents (e.g., the world wide web), with the purpose of measuring its relative importance within the set. A scale of measurement for a link-based scoring technique may be from 0 to 10 (referred to as LBS0 to LBS10, respectively). A LBS0 may indicate no link-based score, and a document may not be said to have a link-based score until the document achieves at least a score of LBS1. In one implementation, the link-based score of a blog may be increased by incoming links from other documents and decreased by outgoing links to other documents.

If the link-based score(s) of incoming link(s) to the blog post is/are small (block 550—YES), then the blog post may be rejected (block 530). For example, if the incoming links to the blog post have small link-based score(s) (e.g., LBS1), then the blog post may not be considered to be important and may be removed from the repository. If the link-based score(s) of incoming link(s) is/are not small (e.g., LBS5 or greater) (block 550—NO), then it may be determined if the blog post has a title (block 560). If the blog post has no title (block 560—YES), then the blog post may be rejected (block 530). For example, a blog post without a title may indicate that the blog post is not trustworthy and/or contains undesirable content. If the blog post has a title (block 560—NO), then the blog post may remain in the repository and not be rejected.

Figure 6:
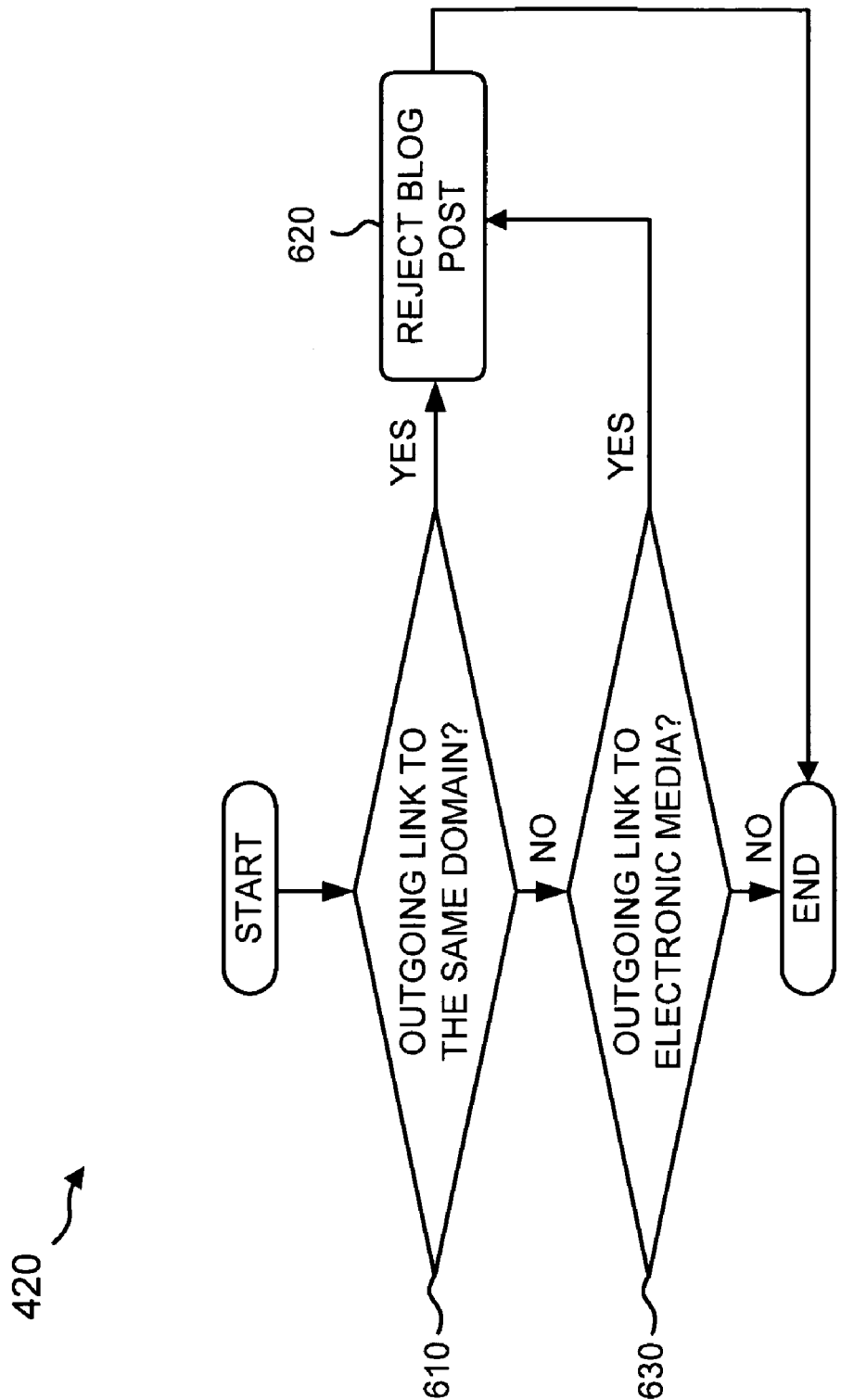

Block 420 of FIG. 4 may include the processing shown in FIG. 6. The processing of FIG. 6 may be performed on each outgoing link of each blog post remaining in the blog post repository. If an outgoing link provides a link to the same domain as the blog post (block 610—YES), then the blog post may be rejected (block 620). For example, in one implementation, a blog post having an outgoing link to itself or other documents in the same domain may indicate that the blog post may not provide editorial content, and may be deleted from the repository. In another implementation, the blog post having an outgoing link to itself or other documents in the same domain may remain in the repository, and/or the outgoing link may be ignored.

If an outgoing link does not provide a link to the same domain as the blog post (block 610—NO), then it may be determined whether the outgoing link provides a link to some form of electronic media, such as an image file or stream, a movie file or stream, and/or an audio file or stream (block 630). If the outgoing link provides a link to a form of electronic media (block 630—YES), then the blog post may be rejected (block 620). For example, in one implementation, a blog post may include an outgoing link to a pornographic image and/or movie and may be deleted from the repository. In another implementation, the blog post having an outgoing link to a form of electronic media may remain in the repository, and/or the outgoing link may be ignored. If the outgoing link does not link to a form of electronic media (block 630—NO), then the blog post containing the outgoing link may remain in the repository.

The processing of FIGS. 5 and 6 may reduce the number of blog posts remaining in the repository to a smaller set of candidates.

Figure 7:
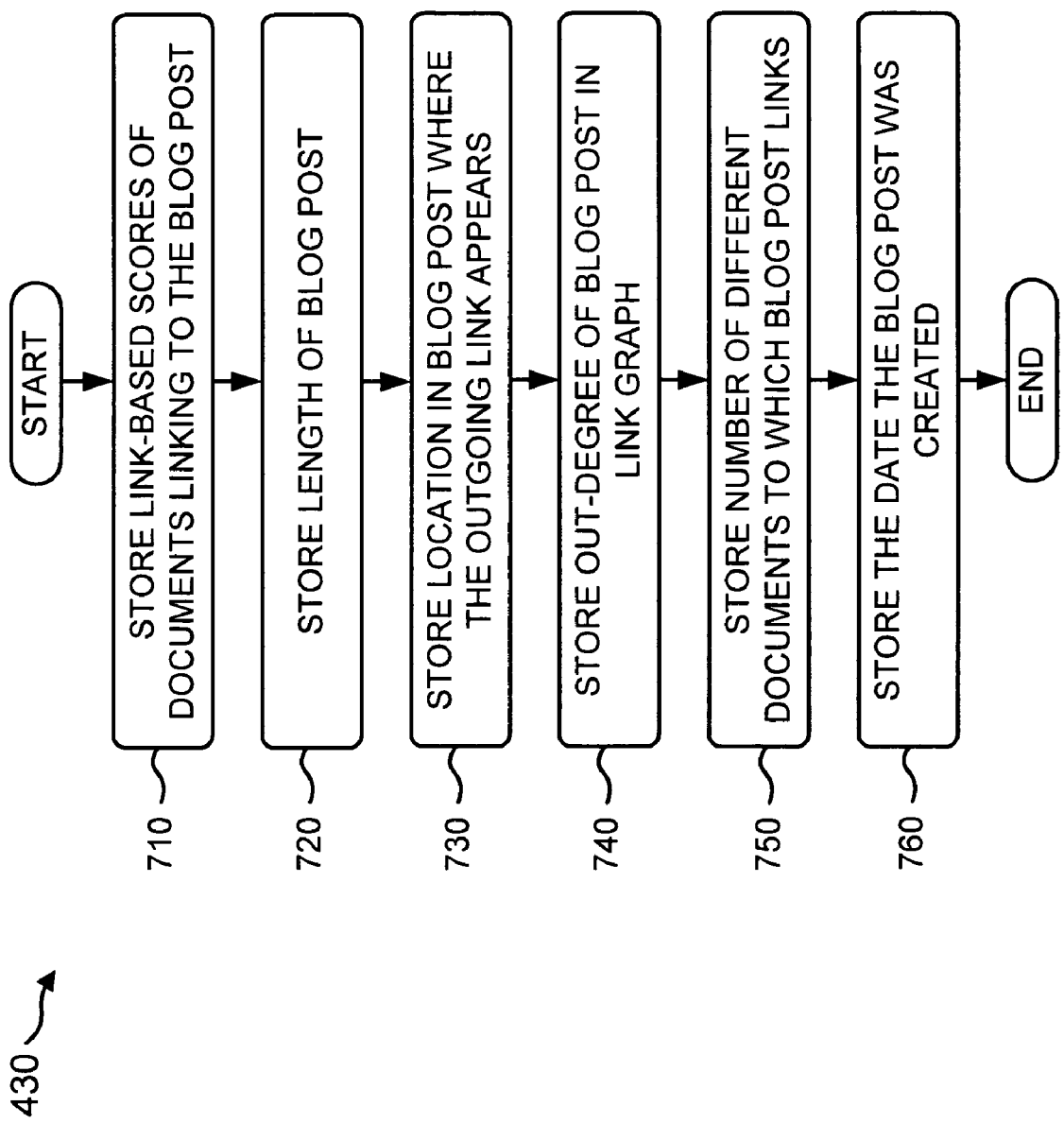

Block 430 of FIG. 4 may include the processing shown in FIG. 7. The processing of FIG. 7 may be performed with respect to each blog post remaining in the blog post repository. The information stored in FIG. 7 may be stored in the blog post repository and/or a separate database from the repository. The processing of FIG. 7 may store the link-based scores of documents linking to the blog post (block 710).

The processing of FIG. 7 may store the length (e.g., number of words, characters, etc.) of the blog post (block 720) and may store the location in the blog post where the outgoing link appears (e.g., the outgoing link appears at the beginning, end, middle, etc. of the blog post) (block 730). An out-degree (i.e., the number of outgoing links contained within the blog post) of the blog post in a link graph may also be stored (block 740). The processing of FIG. 7 may store the number of different documents to which the blog post links (block 750), and may store the date on which the blog post was created (block 760).

The processing of FIG. 7 may store other information associated with each blog post in addition to the information shown in FIG. 7, and/or may store less information than the information shown in FIG. 7. For example, information, such as the address (e.g., uniform resource locator (URL)) and title of the blog post, the address and title of the blog containing the blog post, and/or the link anchor text of an outgoing link of the blog post, may be stored. The information stored by the processing of FIG. 7 may be used in the determination of the relevancy of a blog post to a search result.

Figure 8:
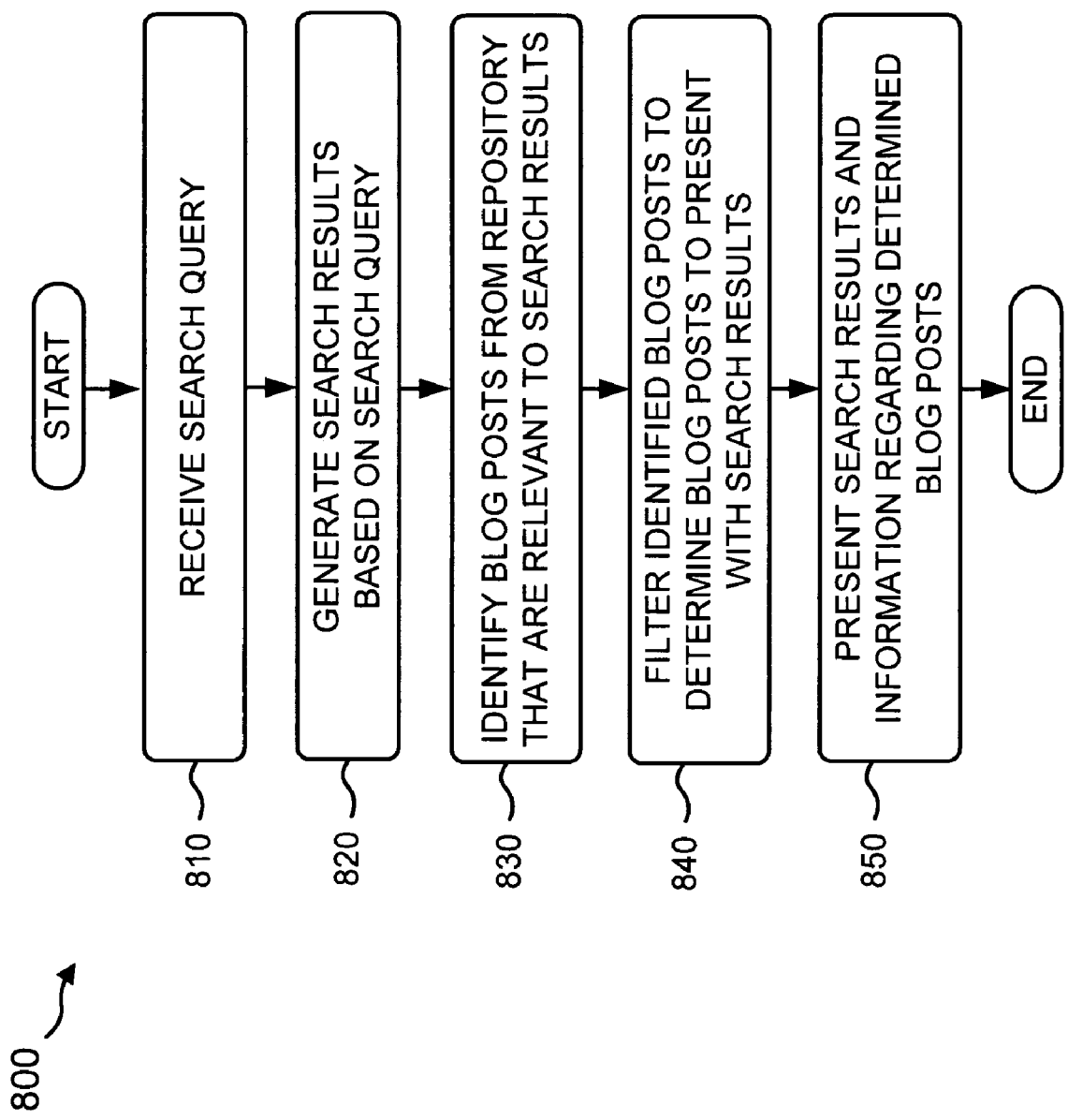

FIG. 8 is a flow chart of exemplary processing 800 for identifying and displaying information associated with blog posts that may be relevant to search results, according to an implementation consistent with the principles of the invention. The processing of FIG. 8 may begin with receipt of a search query (block 810). For example, a user may enter a search term(s) into a search engine. The search results corresponding to the search query may be generated (block 820). For example, the search engine may provide a list of relevant documents in a list of search result documents.

Blog posts from the repository that may be relevant to the search result documents may be identified (block 830). For example, terms from the search result documents may be used to formulate a search query of the blog post repository and identify relevant blog posts. In another implementation, relevant blog posts may be identified in another way, such as by identifying blog posts on the same topic as the search result documents.

The relevant blog posts may be filtered to determine which of the blog posts to present with the search result documents (block 840). The search result documents and information associated with blog posts relevant to the search result documents may be presented (block 850). For example, in one implementation, the blog posts to be presented may be ranked (e.g., based on relevancy to a search result document), and a predetermined number of the ranked blog posts may be presented with corresponding search result documents.

In another implementation, the number of blog posts that may be presented with corresponding search result documents may be dynamic. For example, behavior data obtained from a user history may be used to determine if the user frequently selects the presented blog posts. If the user frequently selects the presented blog posts, then the number of blog posts that may be presented with corresponding search result documents may be increased.

In still another implementation, if a search query indicates that the user is seeking editorial content, then that may be an indication to increase the number of blog posts that may be presented with corresponding search result documents.

Figure 9:
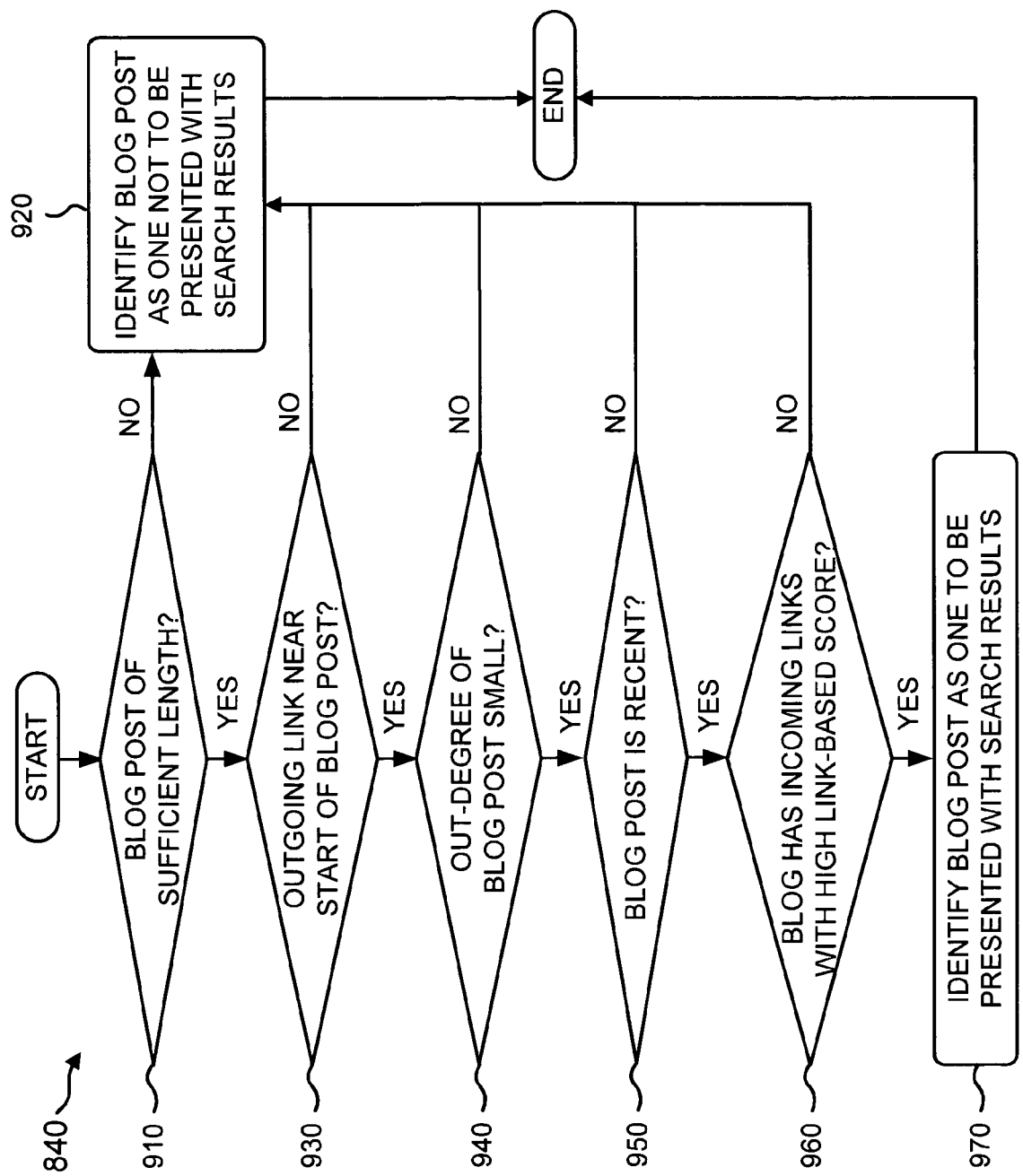

Block 840 of FIG. 8 may include the processing shown in FIG. 9. The processing of FIG. 9 may be performed on each of the blog posts identified as relevant to the search result documents. If the blog post is not of sufficient length (block 910—NO), then the blog post may be identified as one not to be shown with the search results (i.e., the blog post may be rejected) (block 920). For example, in one implementation, a threshold for the length of the blog post (e.g., certain number of words) may be set and the length of the blog post may be compared to this threshold to determine if it is of sufficient length. If the blog post is of sufficient length (block 910—YES), then it may be determined if the outgoing link(s) appear within a predetermined distance from the start of the blog post (block 930).

In another implementation, the threshold for the length of the blog post may be determined based on a statistical model (e.g., a Bayesian model or some other machine learning technique).

If the outgoing link(s) does not appear within the predetermined distance from the beginning of the blog post (block 930—NO), then the blog post may be identified as one not to be shown with the search results (block 920). For example, the predetermined distance may be set to any number depending upon how close it may be desired that the outgoing link(s) be from the start of the blog post. If the outgoing link(s) appears within the predetermined distance from the start of the blog post (block 930—YES), then it may be determined if the out-degree of the blog post is small (block 940). For example, a threshold for the out-degree may be set low to prevent display of blog posts that contain many outgoing links.

If the out-degree of the blog post is not small (block 940—NO), then the blog post may be identified as one not to be shown with the search results (block 920). If the out-degree of the blog post is small (block 940—YES), then it may be determined if the blog post is recent (block 950). For example, in one implementation, a threshold for the number of days a blog post has been in existence (e.g., ten days) may be set to ensure that the blog posts displayed with the search results are timely. In another implementation, a threshold date may be determined (e.g., two weeks prior to the current date), and it may be determined if a blog post was created before the threshold date to ensure that blog posts displayed with the search results are timely. In still another implementation, it may be determined whether a blog post was created before or after a creation date of a search result document to ensure that the blog posts displayed with the search results are timely.

If the blog post is not recent (block 950—NO), then the blog post may be identified as one not to be shown with the search results (block 920). If the blog post is recent (block 950—YES), then it may be determined if the blog post has incoming links from documents having high link-based scores (block 960). For example, it may be determined if the blog post has any incoming links, and whether the documents of these incoming links have link-based scores above a threshold (e.g., greater than a LBS5).

If the blog post does not have incoming links from documents having high link-based scores (block 960—NO), then the blog post may be identified as one not to be shown with the search results (block 920). If the blog post has incoming links from documents having high link-based scores (block 960—YES), then the blog post may be identified as one to be shown with the search results (block 970).

The processing of FIG. 9 may result in a determination of blog post candidates that may be used to match with relevant search results. If a search engine outputs more than one search result, then information associated with blog posts relevant to a search result, a subset of the search results, and/or all of the search results may be available for display, if such blog posts exist. It may then be determined which blog posts are to be displayed. The system and method of displaying information associated with blog posts that may be relevant to a search result according to implementations consistent with the principles of the invention will be described in more detail below.

Although various exemplary filtering operations were described in connection with FIGS. 4-9, more or less filtering operations may be included consistent with the principles of the invention. For example, more filtering operations may be included in the processing of FIGS. 4-9 if it is determined that too many blog posts remain after the filtering operations shown in FIGS. 4-9. In one implementation consistent with the principles of the invention, the thresholds discussed above may be set to prevent information associated with as many irrelevant blog posts from being displayed with search results as possible.

Any or all of the blog post operations may be turned on or off or preset by the user. For example, the user may select to perform blog post operations when the user indicates, such as by clicking on a button, a pop-up text block or window, and/or a drop-down list. Alternatively or additionally, the blog post operations may be automatically performed until a user disables the blog post operations.

The processing of FIGS. 4-9 may be performed at any time. In one implementation consistent with the principles of the invention, the processing of FIGS. 4-9 may be performed offline (e.g., prior to a user inputted search query). In another implementation, the processing of FIGS. 4-7 and blocks 810-830 of FIG. 8 may be performed offline, and/or the processing of FIG. 9 and blocks 840 and 850 of FIG. 8 may be performed in response to a user inputted search query. In still another implementation, the blog posts that may be relevant to search results may be determined offline by looking at all of the outgoing links in the blog posts contained in the repository, and storing this information with the documents corresponding to the outgoing links.

Although the implementations described above show specific heuristics that may be used to identify blog posts to associate with to a search result, any number of additional or alternative heuristics may be used to identify blog posts to associate with a search result. For example, the additional or alternative heuristics may fall into one of four categories: topicality, quality, freshness, and/or significance. Topicality may include, for example, a determination of whether a blog post is really talking about a search result. Quality may include, for example, a determination of whether the blog post is well written, information rich, and/or generally useful. Freshness may include, for example, a determination of whether a blog post is recent and/or provides timely information. Significance may include, for example, a determination of whether the information provided by a blog post is important.

Other additional or alternative heuristic factors that may be considered may include, for example: a determination of whether many people subscribe to a blog post (e.g., the popularity of the blog post), a determination of whether the blog post has a particular political slant (e.g., conservative, liberal, and/or moderate), a determination of the objectivity of a blog post (e.g., the blog post is objective or one-sided), and/or a determination of whether a blog post expresses an opinion about a search result (e.g., showing a blog post called "I love search result 1", showing a blog post called "I hate search result 1", not showing a blog post called "I'm mentioning search result 1 in passing", not showing all "I love search result 1" blog posts, and/or not showing all "I hate search result 1" blog posts).

Exemplary Display Options of Blog Posts

FIGS. 10-15 are exemplary diagrams of exemplary display options for information associated with blog posts that may be relevant to search results according to implementations consistent with the principles of the invention. In addition to the exemplary diagrams of FIGS. 10-15, information associated with blog posts that may be relevant to search results may be displayed as shown in FIG. 1. In FIG. 1, a user may display information associated with blog posts that may be relevant to a search result by selecting an icon or graphic, as described previously.

First Exemplary Display of Blog Posts

Figure 10:
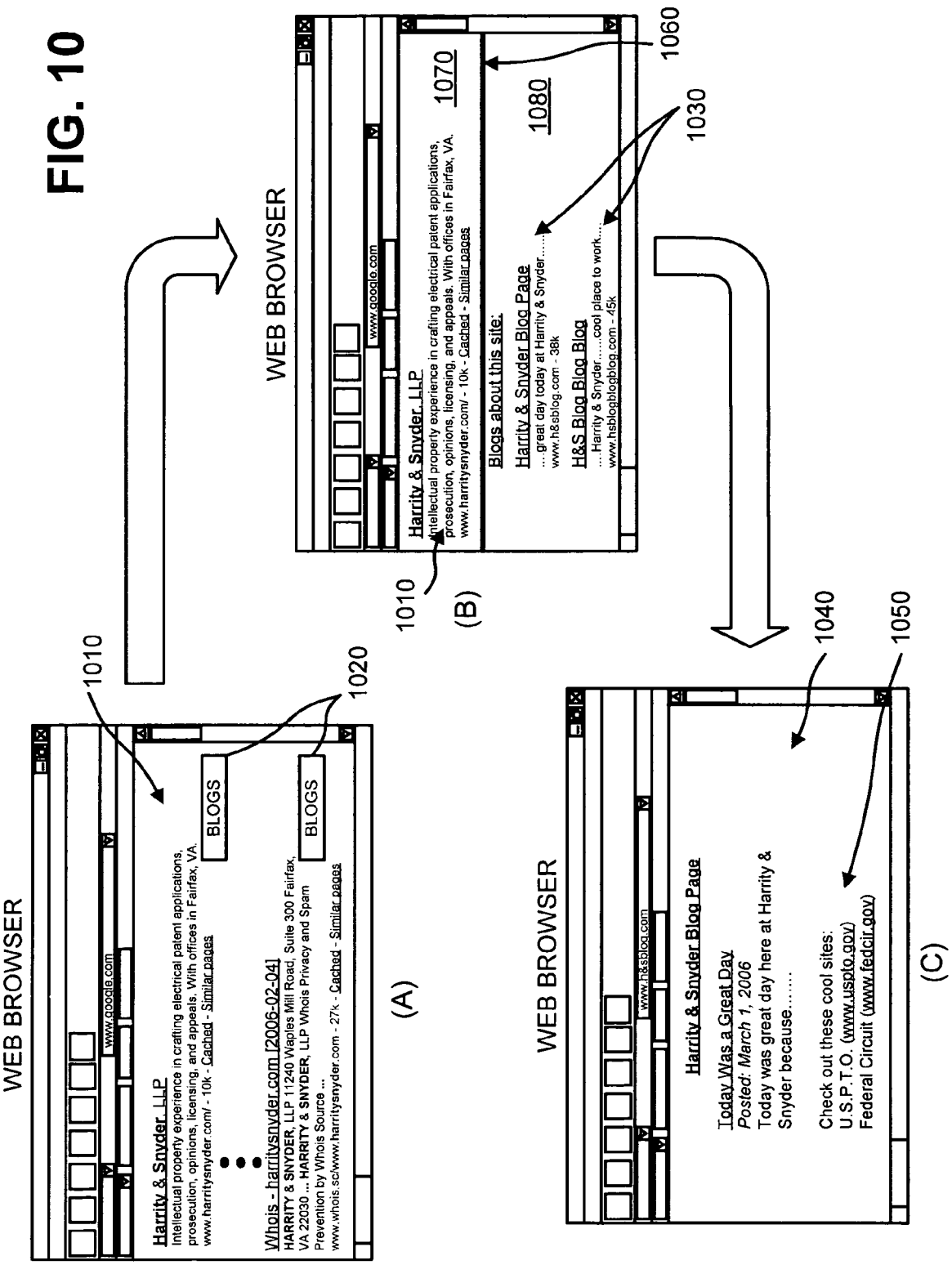
FIGS. 10-15 are exemplary diagrams of exemplary display options for information associated with blog posts that may be relevant to a search result according to implementations consistent with the principles of the invention.

In one implementation as shown at (A) in FIG. 10, a user may access search results 1010 with a search engine (e.g., the Google search engine) using a web browser. Each search result 1010 may include, among other things, a link (where underlining denotes a link) to a document associated with the search result, a snippet associated with the search result, and/or a document address (e.g., www.harritysnyder.com) associated with the search result. Each search result 1010 may include a button 1020, which, when selected by a pointing device (e.g., a mouse), may display information associated with blog posts that may be relevant to search result 1010.

In one implementation, as shown at (B) in FIG. 10, if button 1020 is selected, information associated with blog posts 1030 that may be relevant to search result 1010 may be displayed. For example, if a user selects button 1020 next to the "Harrity & Snyder, LLP" search result 1010, information associated with blog posts 1030 relevant to this search result 1010 may be displayed in connection with search result 1010. Information associated with each blog post 1030 may include, for example, a link to the blog post, a snippet associated with the blog post, and/or an address of the blog post. Although information associated with any number of blog posts 1030 may be displayed, FIG. 10 shows two blog posts 1030, "Harrity & Snyder Blog Page" and "H&S Blog Blog Blog," and their associated information with the "Harrity & Snyder, LLP" search result 1010.

In one implementation, information associated with blog posts 1030 may be displayed in the same browser window as search result 1010, as previously shown in FIG. 1. In another implementation as shown at (B) of FIG. 10, information associated with blog posts 1030 may be displayed in the same browser window as search result 1010, but may be separated from search result 1010 by a pane divider 1060. Pane divider 1060 may split the browser window into two panes: an upper pane 1070 which may display search result 1010, and a lower pane 1080 which may display information associated with blog posts 1030, although the panes may be arranged in any other configuration (e.g., side by side).

As shown at (C) in FIG. 10, selection of a link associated with blog post 1030 may cause a blog post 1040 associated with the link to be presented. Blog post 1040 may include useful information associated with search result 1010. For example, if a user selects the link for the "Harrity & Snyder Blog Page," then the blog post associated with that link may be displayed as blog post 1040. Blog post 1040 may include any type of information, such as incoming links, and outgoing links 1050 (e.g., www.uspto.gov and www.fedcir.gov). Incoming links may include any document that links to blog post 1040. Outgoing links 1050 may include any document that links to blog post 1040.

In one implementation, blog post 1040 may be displayed in a separate browser window as shown at (C) in FIG. 10. In another implementation, blog post 1040 may be displayed in a pane in the same browser window as search result 1010 and/or information associated with blog posts 1030, in a manner similar to the way panes 1070, 1080 are provided.

Second Exemplary Display of Blog Posts

Figure 11:
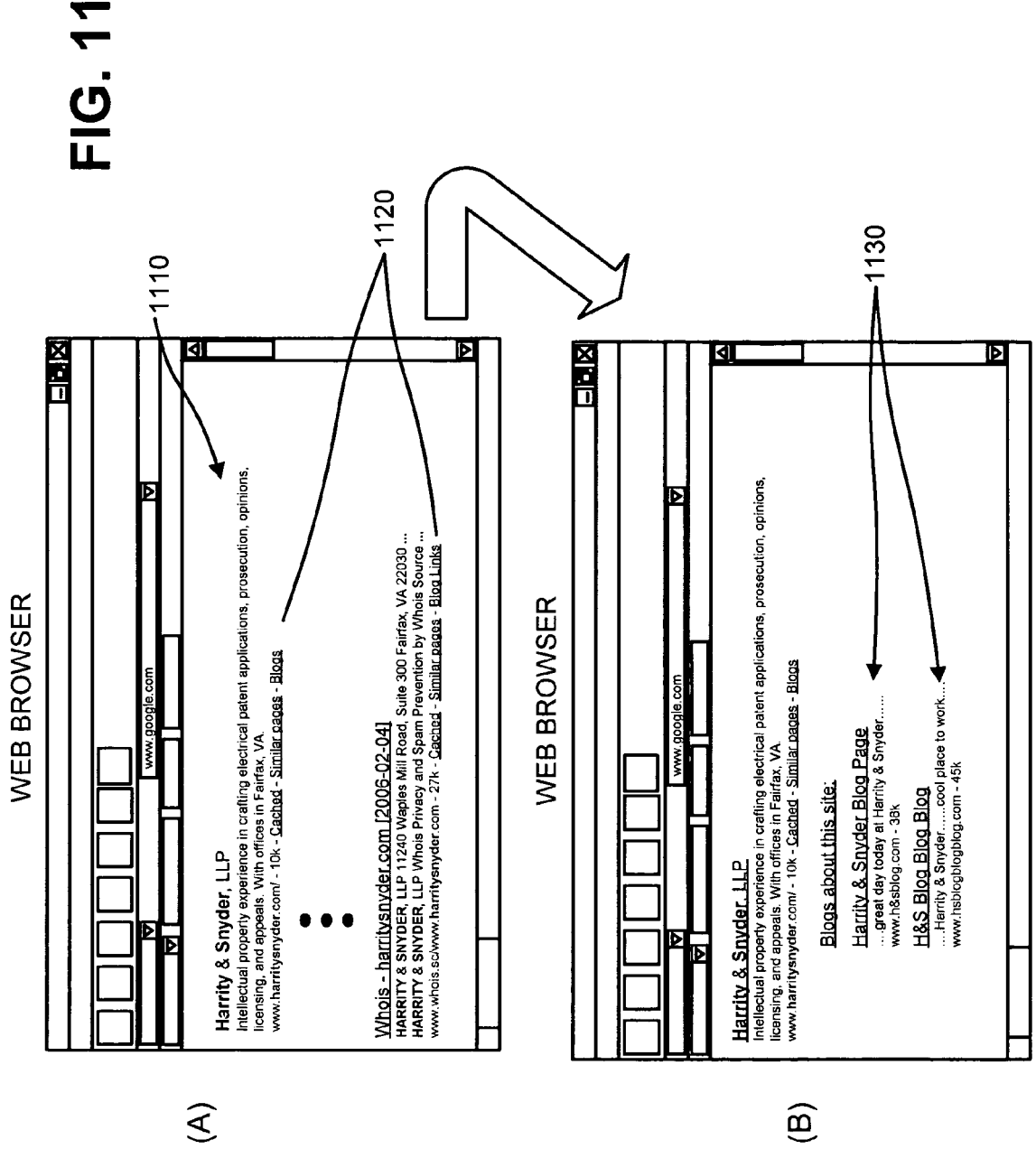

In another implementation as shown at (A) in FIG. 11, a user may access search results 1110 with a search engine using a web browser. Each search result 1110 may include a link 1120 (instead of button 1020), which, when selected by a pointing device (e.g., a mouse), may display information associated with blog posts that relate to search result 1110. For example, link 1120 entitled "Blogs" may be provided adjacent to the links, "Cached" and "Similar Pages," that may be provided by the Google search engine.

As shown at (B) in FIG. 11, if link 1120 is selected, information associated with blog posts 1130 that may be relevant to search result 1110 may be displayed concurrently with search result 1110. For example, if a user selects link 1120 associated with the "Harrity & Snyder, LLP" search result 1110, information associated with blog posts 1130 relevant to this search result 1110 may be displayed in connection with search result 1110, possibly under a header "Blogs about this site." Although any number of blog posts 1130 may be displayed, FIG. 11 shows two blog posts 1130, "Harrity & Snyder Blog Page" and "H&S Blog Blog Blog," and their associated information with the "Harrity & Snyder, LLP" search result 1110.

Third Exemplary Display of Blog Posts

Figure 12:
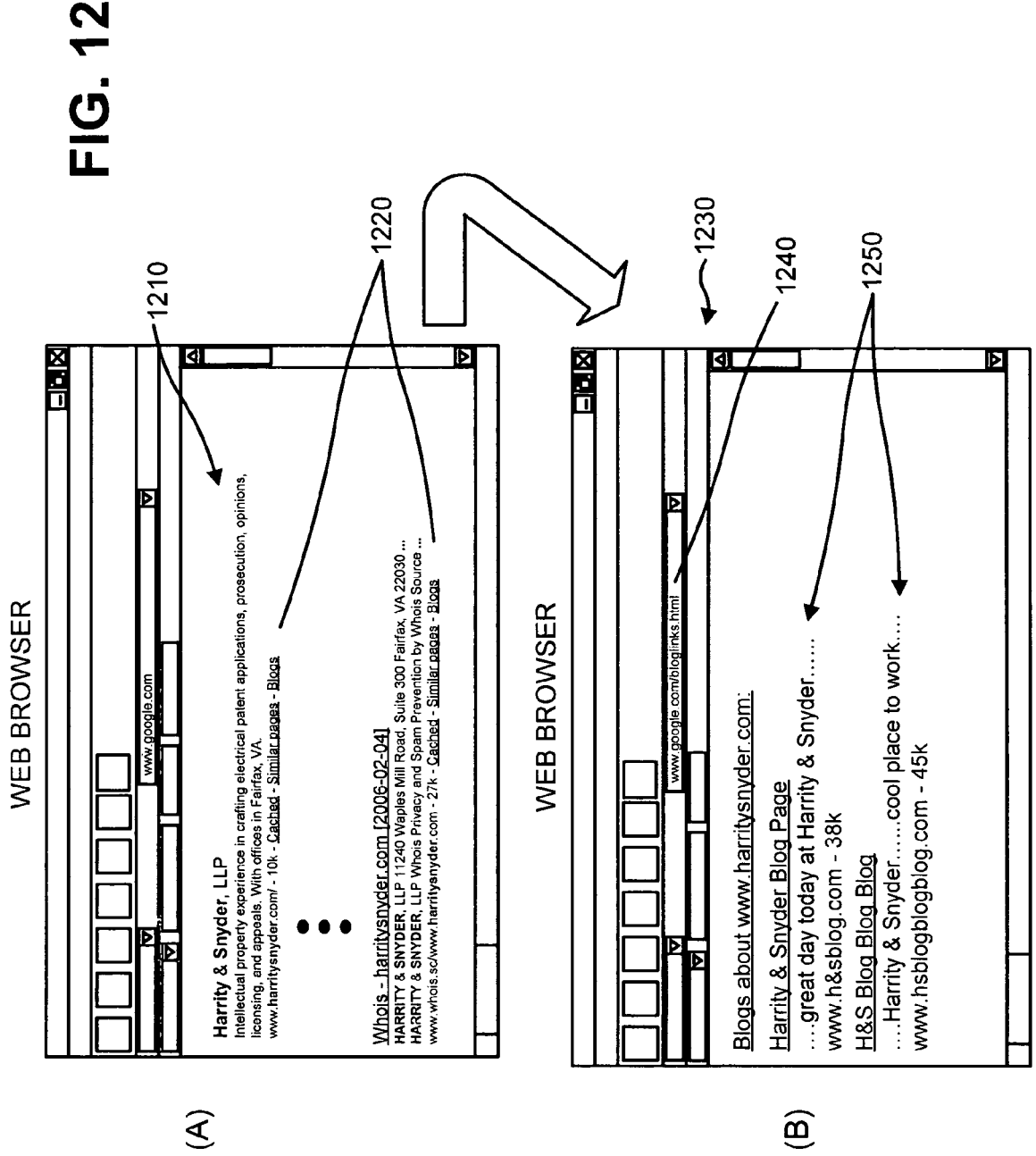

In an alternative to the implementation shown in FIG. 11 and as shown in FIG. 12, a user may access search results 1210 with a search engine using a web browser. Each search result 1210 may include a link 1220 (which may be similar to link 1120), which, when selected by a pointing device, may display information associated with blog posts that may be relevant to search result 1210. For example, link 1220 entitled "Blogs" may be provided.

As shown at (B) in FIG. 12, if link 1220 is selected, information associated with blog posts 1250 that may be relevant to search result 1210 may be displayed in a browser window 1230 that may be separate from the browser window shown at (A) in FIG. 12. Browser window 1230 may have a separate address 1240 from the address shown at (A) in FIG. 12. For example, if link 1220 associated with the "Harrity & Snyder, LLP" search result 1210 is selected, then information associated with blog posts 1250 relevant to this search result 1210 may be displayed in separate browser window 1230 (e.g., under a header "Blogs about www.harritysnyder.com"). Although any number of blog posts 1250 may be displayed, FIG. 12 shows two blog posts 1250, "Harrity & Snyder Blog Page" and "H&S Blog Blog Blog," and their associated information, in separate browser window 1230.

Although the information associated with blog posts shown in FIGS. 1, 10, and 11 are displayed concurrently with their corresponding search result, the information associated with blog posts of these figures may be displayed in a separate browser window in a manner similar to that shown in FIG. 12. In an another implementation, the information associated with blog posts shown in FIGS. 1 and 10-12 may be displayed in a window other than a browser window. For example, information associated with blog posts may be displayed in a pop-up window or in another manner.

Fourth Exemplary Display of Blog Posts

Figure 13:
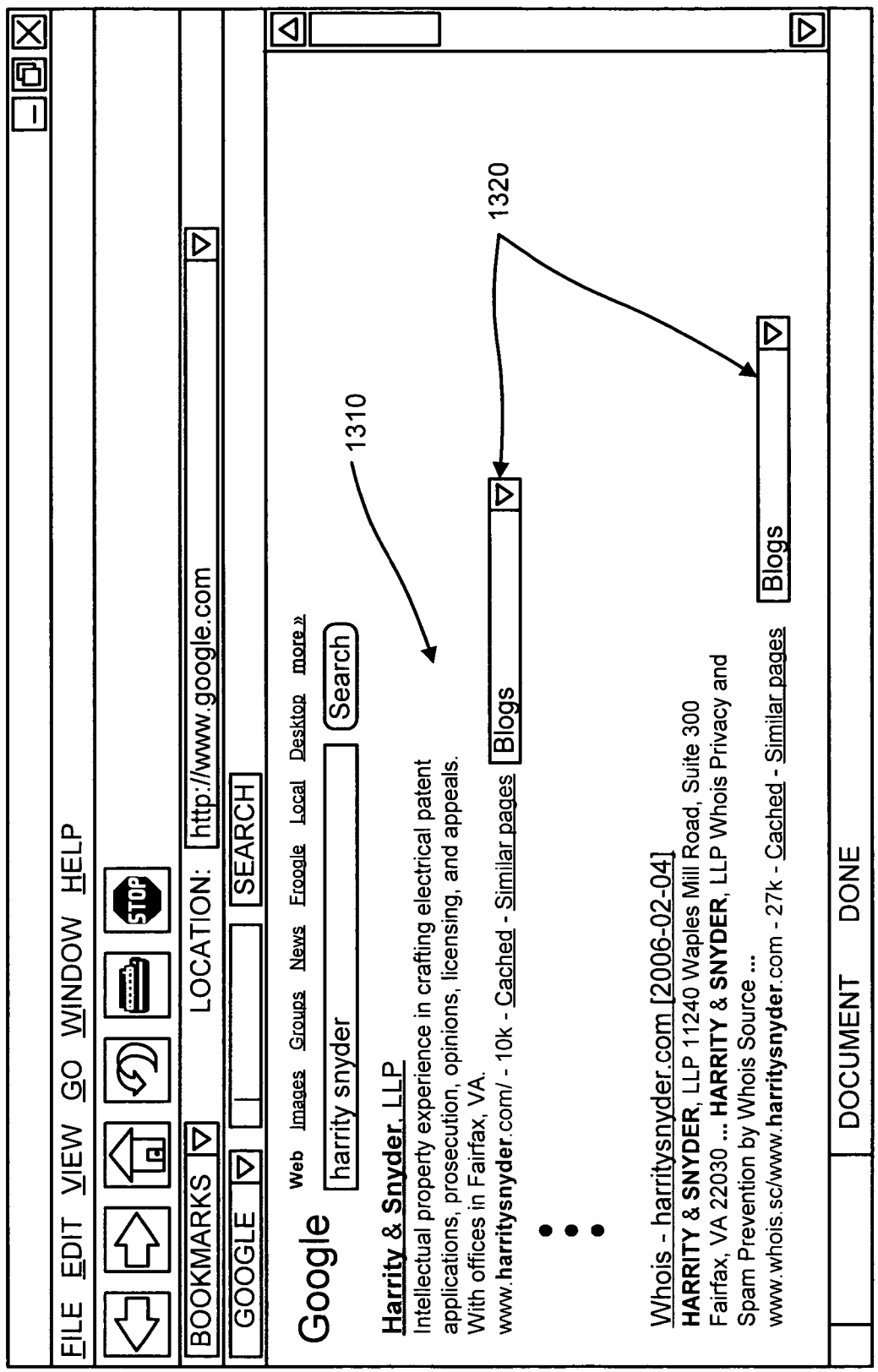

In one implementation, as shown in FIG. 13, a user may access search results 1310 with a search engine using a web browser. Each search result 1310 may include a pull-down menu (or drop-down list) 1320, which, when selected may display information associated with blog posts that may be relevant to search result 1310. For example, pull-down menu 1320 entitled "Blogs" may be provided adjacent to the links, "Cached" and "Similar Pages."

Figure 14:
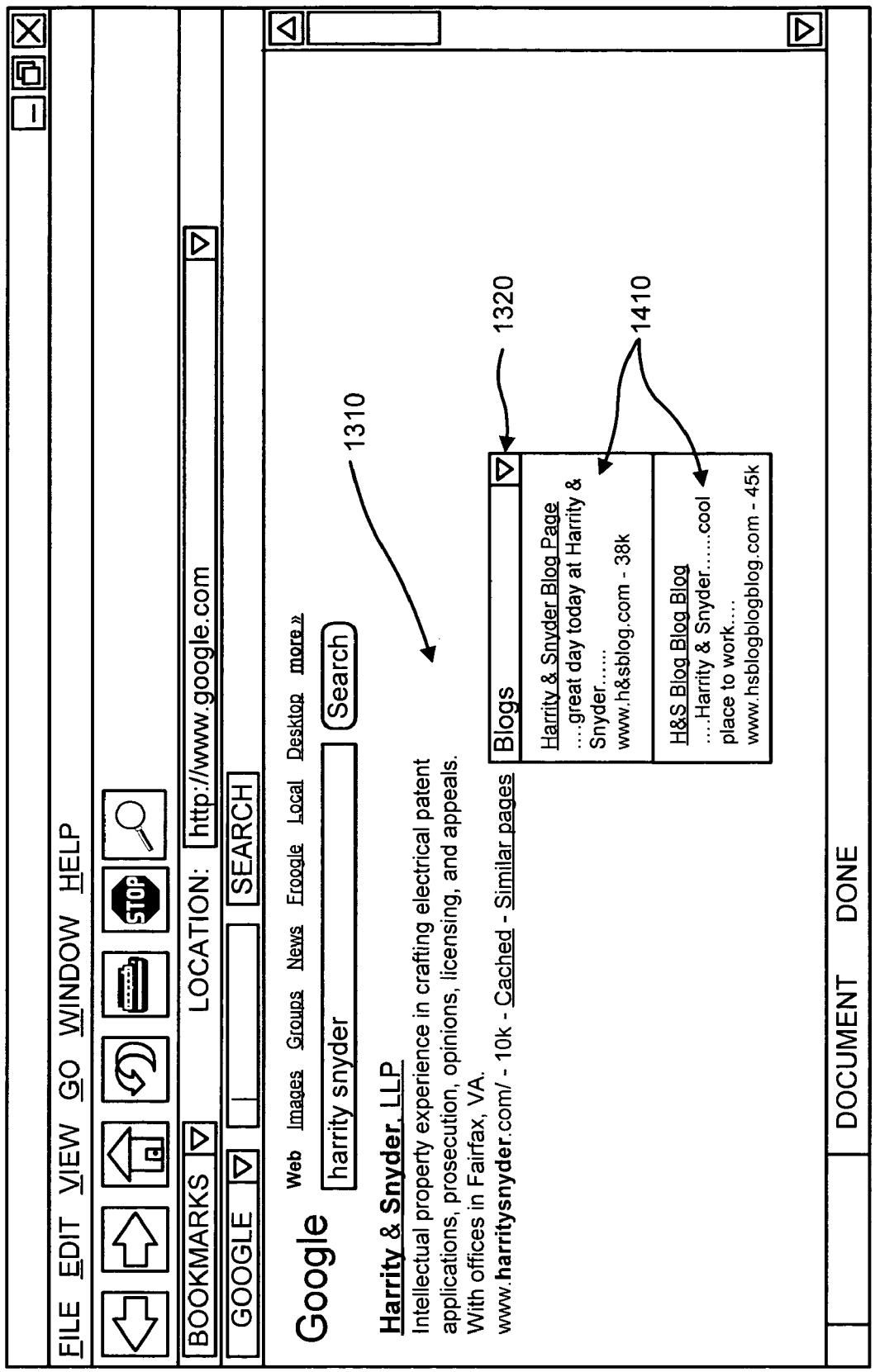

As shown in FIG. 14, if pull-down menu 1320 is selected, information associated with blog posts 1410 that may be relevant to search result 1310 may be displayed within pull-down menu 1320 and/or concurrently with search result 1310. For example, if a user selects pull-down menu 1320 associated with the "Harrity & Snyder, LLP" search result 1310, information associated with blog posts 1610 that may be relevant to this search result 1310 may be displayed within pull-down menu 1320. Although any number of blog posts 1410 may be displayed, FIG. 14 shows two blog posts 1410, "Harrity & Snyder Blog Page" and "H&S Blog Blog Blog," and their associated information, within pull-down menu 1320.

Figure 15:
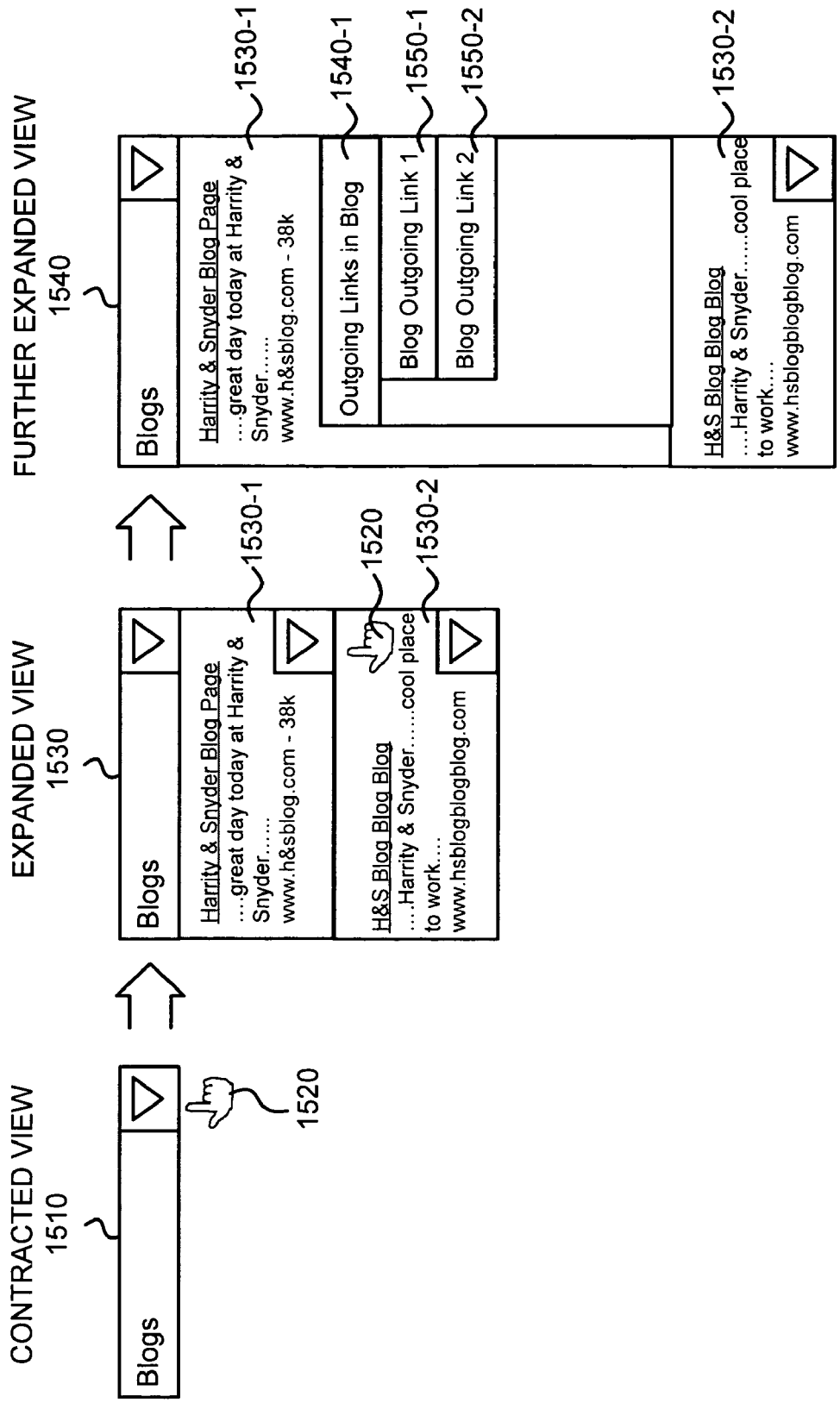

FIG. 15 is an exemplary diagram of an additional exemplary implementation of the invention in which a contracted view of a list of hierarchical data (e.g., blog posts and related information) may be expanded to include elided portions of data. As shown in FIG. 15, a contracted view 1510 of the pull-down menu may display the pull-down menu title "Blogs." For example, contracted view 1510 may correspond to pull-down menu 1320 shown in FIGS. 13 and 14. Contracted view 1510 may be a first level in a data hierarchy, which subsequent levels of data being elided or omitted from contracted view 1510. Upon the selection of contracted view 1510, an expanded view 1530 of the data items may be displayed. Selection may include, for example, a mouse click or the occurrence of a "mouse-over" event 1520 over a selection area (e.g., arrows shown in FIG. 15), though other ways of selecting a data item may be alternatively used.

Expanded view 1530 may include a next level of data in a data hierarchy for a given data item. For example, as depicted in FIG. 15, contracted view 1510 (e.g., "Blogs") may be expanded to include data items 1530-1 and 1530-2 (e.g., information associated with blog posts for "Harrity & Snyder Blog Page" and "H&S Blog Blog Blog," respectively) that may be omitted from contracted view 1510.

Upon the selection of a data item of expanded view 1530, a further expanded view 1540 of the data items may be displayed. Selection may include, for example, a mouse click or the occurrence of a "mouse-over" event 1520, though other ways of selecting a data item may be alternatively used. Further expanded view 1540 may include a further level of data in a data hierarchy for a given data item. For example, as shown in FIG. 15, data item 1530-1 may be expanded to include data item 1540-1 (e.g., "Outgoing Links in Blog") that may be omitted from expanded view 1530. Data item 1540-1 may be expanded to include data items 1550-1 and 1550-2 (e.g., "Blog Outgoing Link 1" and "Blog Outgoing Link 2," respectively) that may be elided until data item 1540-1 is selected. This process may be continued until the entire hierarchy of data is displayed.

FIGS. 13-15 illustrate elided data items in the data hierarchy as being included in an expansion of a given data item when selected. In other implementations, elided data items may be appended to a given data item (e.g., appear to "pop out" of the side of a given data item in a dimension perpendicular to a dimension in which the data list primarily extends), or may entirely replace a given data item. Selection may include "clicking" on a given data item, in addition to a "mouse-over" event.

In the exemplary implementations of FIGS. 13-15, the elided data is depicted as expanding below the original data. In other implementations, however, the elided data may be expanded anywhere relative to the original data. For example, the elided data may be inserted and/or expanded above, between, below, or in two or more blocks in any of these locations. As another example, the elided data may be expanded alongside the original data so that the display expands sideways, sideways and down, and/or sideways and up and down (i.e., to form an area shaped like a "T" on its side). As a further example, the elided data may expand in an entirely different region of the document. As an additional example, the expanded elided data may overlap the adjacent text instead of "pushing" the adjacent text up or down.

In a further implementation, a size of the expanded view may be set by the user. For example, the data item may have "active handles" at corners of the data item that the user can "drag open" to the size the user desires, with additional elided data being displayed once there is sufficient room in the expanded view. Thus, in this implementation, elided data may be added progressively rather than all of it displayed at all times.

In an additional implementation, the expanded data item (e.g., the data item visually expanded to include the elided data) may change its appearance to indicate that it has been selected by a user. For example, the change in appearance may be a new background color, a new border, or a change to the color/shape of some elements within the expanded view of the data item.

Although FIGS. 10-15 show exemplary display options for information associated with blog posts that may be relevant to search results, the display options depicted therein may be used to display any other information that may be relevant to search results. For example, in one implementation, a single button or icon may be displayed, and, when selected, may show any information relevant to search results (e.g., a bulk open and/or expand all feature). In addition to blog posts, other information relevant to search results may include, for example, documents similar to the search result documents, electronic media, advertisements, news, local information, and/or any other information capable of being displayed by a search engine (e.g., the Google, Yahoo, etc. search engines).

CONCLUSION

Systems and methods consistent with the principles of the invention may provide information associated with blog posts that may be relevant to a search result. While described in terms of blog posts, the systems and methods described herein may also apply to other types of documents, such as blogs.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4-9, the order of the acts may be modified in other implementations consistent with the principles of the invention. Further, non-dependent acts may be performed in parallel.

Also, exemplary user interfaces have been described with respect to FIGS. 1 and 10-15. In other implementations consistent with the principles of the invention, the user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   receiving, by at least one of the one or more server devices, a first search query to perform a web search, the first search query being received from a client device;
   identifying, by a processor associated with the one or more server devices, a search result, based on the first search query, from a corpus of web documents;
   formulating, by a processor associated with the one or more server devices, a second search query to perform a blog search, where the second search query includes terms from the search result;
   searching, by a processor associated with the one or more server devices and using the second search query, a repository of documents that include blog posts, to identify a blog post relevant to the search result;

determining, by a processor associated with the one or more server devices,
  whether the identified blog post is associated with an out-degree larger than an out-degree threshold, where the out-degree corresponds to a quantity of outgoing links included within the identified blog post;
rejecting, by a processor associated with the one or more server devices, the identified blog post if the identified blog post is associated with the out-degree larger than the outgoing threshold; and
sending, by at least one of the one or more server devices, the search result and information associated with the identified blog post to the client device, if the identified blog post is not rejected.

2. The method of claim 1, further comprising:
determining whether the identified blog post was created before a first time or after a second time; and
rejecting the identified blog post if the identified blog post was created before the first time or after the second time.

3. The method of claim 1, where the sending the search result comprises:
sending a selectable item with the search result; and
sending the information associated with the identified blog post when a selection of the selectable item is received.

4. The method of claim 3, where the selectable item comprises at least one of an icon, a button, a link, or a pull-down menu.

5. The method of claim 1, further comprising:
sending to the client device the identified blog post to be displayed when a selection of the information associated with the identified blog post is received.

6. The method of claim 1, where the information associated with the identified blog post is sent to be displayed in a same window as the search result.

7. The method of claim 1, where the information associated with the identified blog post is sent to be displayed in a different window than the search result.

8. The method of claim 1, where the information associated with the identified blog post is sent to be displayed in a same window as the search result and in a different pane than the search result.

9. The method of claim 1, where the information associated with the identified blog post is sent to be displayed in a pull-down menu.

10. The method of claim 1, where the searching the repository of documents that include blog posts using the second search query to identify a blog post relevant to the search result includes identifying a plurality of blog posts relevant to the search result, the method further comprising:
ranking the plurality of blog posts relevant to the search result based on a relevancy to the search result; and
where sending the search result and information associated with the identified blog post to the client device includes:
  sending information about a particular number of blog posts from the plurality of blog posts relevant to the search result.

11. The method of claim 10, where the particular number of blog posts is based on a frequency with which a user, associated with the client device, has selected presented blog posts in the past.

12. The method of claim 10, further comprising:
determining that the first search query is associated with a search for editorial content; and
increasing the particular number of blog posts when the search query is associated with a search for editorial content.

13. A system comprising:
one or more server devices to:
receive, from a client device, a first search query,
identify a search result document, based on a search performed using the first search query, from a corpus of web documents,
formulate a second search query to perform a blog search, where the second search query includes terms from the search result document,
search, using the second search query, a repository of documents that include blog posts, to identify a blog post relevant to the search result document,
determine whether the identified blog post is associated with an out-degree larger than an out-degree threshold, where the out-degree corresponds to a quantity of outgoing links included within the identified blog post;
reject the identified blog post when the identified blog post is associated with an out-degree larger than the out-degree threshold, and
send, to the client device, information associated with the identified blog post and the search result document if the identified blog post was not rejected.

14. The system of claim 13, where the processor further executes instructions in the memory to:
send instructions to the client device to display a selectable item with the search result document; and
send instructions to the client device to display the information associated with the identified blog post in response to the selectable item being selected.

15. The system of claim 14, where the selectable item comprises at least one of an icon, a button, a link, or a pull-down menu.

16. The system of claim 14, where the information associated with the identified blog post is sent to be displayed in a same window as the search result document and in a different pane than the search result document or a different window than the search result document.

17. The system of claim 14, where the processor is to further execute instructions in the memory to at least one of:
reject the identified blog post when the identified blog post includes a particular number of outgoing links;
reject the identified blog post when the identified blog post includes a particular number of incoming links;
reject the identified blog post when the identified blog post is untitled;
reject the identified blog post when the identified blog post includes an outgoing link to a document in a same domain as the identified blog post;
reject the identified blog post when the identified blog post includes an outgoing link to electronic media; or
reject the identified blog post when the identified blog post was created before a first time or after a second time.

18. One or more memory devices storing instructions executable by one or more processors, the one or more memory devices comprising:
one or more instructions to receive a first search query to perform a web search, the first search query being received from a client device;
one or more instructions to identify a search result, based on the first search query, from a corpus of web documents;
one or more instructions to formulate a second search query to perform a blog search, where the second search query includes terms from the search result;
one or more instructions to search, using the second search query, a repository of documents that include blog posts, to identify a blog post relevant to the search result;

one or more instructions to determine
  whether the identified blog post is associated with an out-degree larger than an out-degree threshold, where the out-degree corresponds to a quantity of outgoing links included within the identified blog post;
one or more instructions to reject the identified blog post when the identified blog post is associated with the out-degree larger than the outgoing threshold; and
one or more instructions to send the search result and information associated with the identified blog post to the client device, when the identified blog post is not rejected.

19. The one or more memory devices of claim 18, further comprising:
one or more instructions to send instructions to the client device to display a selectable item with the search result; and
send instructions to the client device to display the information associated with the identified blog post in response to the selectable item being selected.

20. The one or more memory devices of claim 19, where the selectable item comprises at least one of an icon, a button, a link, or a pull-down menu.

21. The one or more memory devices of claim 18, where the information associated with the identified blog post is sent to be displayed in at least one of a same pane of a window as the search result or a same window as the search result and in a different pane than the search result.

22. The one or more memory devices of claim 18, further comprising:
one or more instructions to reject the identified blog post when the identified blog post includes a particular number of outgoing links;
one or more instructions to reject the identified blog post when the identified blog post includes a particular number of incoming links;
one or more instructions to reject the identified blog post when the identified blog post is untitled;
one or more instructions to reject the identified blog post when the identified blog post includes an outgoing link to a document in a same domain as the identified blog post;
one or more instructions to reject the identified blog post when the identified blog post includes an outgoing link to electronic media; or
one or more instructions to reject the identified blog post when the identified blog post was created before a first time or after a second time.

23. A method performed by one or more server devices, the method comprising:
receiving, by at least one of the one or more server devices, a first search query to perform a web search, the first search query being received from a client device;
identifying, by a processor associated with the one or more server devices, a search result, based on the first search query, from a corpus of web documents;
formulating, by a processor associated with the one or more server devices, a second search query to perform a blog search, where the second search query includes terms from the search result;
searching, by a processor associated with the one or more server devices and using the second search query, a repository of documents that include blog posts, to identify a blog post relevant to the search result;
determining, by a processor associated with the one or more server devices, whether the identified blog post is associated with incoming links from documents having a link-based score lower than a link-based threshold, where the link-based score, for a particular document, is based on incoming links associated with the particular document;
rejecting, by a processor associated with the one or more server devices, the identified blog post if the identified blog post is associated with the incoming links from documents having the link-based score lower than the link-based threshold; and
sending, by at least one of the one or more server devices, the search result and information associated with the identified blog post to the client device, if the identified blog post is not rejected.

24. The method of claim 23, further comprising:
determining whether the identified blog post has a length smaller than a length threshold; and
rejecting the identified blog post if the identified blog post has a length smaller than the length threshold.

25. The method of claim 23, further comprising:
determining whether the identified blog post includes outlinks positioned within the identified blog post at least a particular distance from a beginning of the identified blog post; and
rejecting the identified blog post if the identified blog post includes outlinks positioned within the identified blog post at least the particular distance from the beginning of the identified blog post.

26. A system comprising:
one or more server devices to:
receive, from a client device, a first search query,
identify a search result document, based on a search performed using the first search query, from a corpus of web documents,
formulate a second search query to perform a blog search, where the second search query includes terms from the search result document,
search, using the second search query, a repository of documents that include blog posts, to identify a blog post relevant to the search result document,
determine whether the identified blog post is associated with incoming links from documents having a link-based score lower than a link-based threshold, where the link-based score, for a particular document, is based on incoming links associated with the particular document,
reject the identified blog post when the identified blog post is associated with incoming links from documents having a link-based score lower than a link-based threshold, and
send, to the client device, information associated with the identified blog post and the search result document if the identified blog post was not rejected.

27. The system of claim 26, where the processor is to further execute instructions in the memory to:
reject the identified blog post when the identified blog post has a length smaller than a length threshold.

28. The system of claim 26, where the processor is to further execute instructions in the memory to:
reject the identified blog post when the identified blog post includes outlinks positioned within the identified blog post at least a particular distance from a beginning of the identified blog post.

* * * * *